United States Patent
Watanabe et al.

(10) Patent No.: US 7,346,932 B2
(45) Date of Patent: Mar. 18, 2008

(54) DATA PROCESSING APPARATUS, A DATA PROCESSING METHOD, A DATA RECORDING MEDIUM ON WHICH DATA PROCESSING PROGRAM THAT IS READABLE BY A COMPUTER ARE RECORDED, AND A RECORDING MEDIUM

(75) Inventors: Tomo Watanabe, Tsurugashima (JP); Kenichiro Yano, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 502 days.

(21) Appl. No.: 10/025,809

(22) Filed: Dec. 26, 2001

(65) Prior Publication Data

US 2002/0083348 A1 Jun. 27, 2002

(30) Foreign Application Priority Data

Dec. 27, 2000 (JP) .......................... P2000-398918

(51) Int. Cl.
*G06F 12/14* (2006.01)
*H04K 1/00* (2006.01)

(52) U.S. Cl. .................. 726/33; 713/183; 713/193
(58) Field of Classification Search ................ 713/202, 713/201, 183, 193; 700/225–227; 726/33
See application file for complete search history.

(56) References Cited

U.S. PATENT DOCUMENTS

| 5,113,518 A | * | 5/1992 | Durst et al. .................... 726/29 |
| 5,282,247 A | * | 1/1994 | McLean et al. ............. 711/164 |
| 5,537,544 A | * | 7/1996 | Morisawa et al. .......... 713/202 |
| 5,826,011 A | * | 10/1998 | Chou et al. ................... 726/31 |
| 5,922,073 A | * | 7/1999 | Shimada ..................... 713/200 |
| 6,012,146 A | * | 1/2000 | Liebenow .................... 726/17 |
| 6,067,622 A | * | 5/2000 | Moore .......................... 726/31 |
| 6,964,045 B1 | * | 11/2005 | Grimes et al. ................ 710/10 |
| 2002/0174360 A1 | * | 11/2002 | Ikeda .......................... 713/200 |

FOREIGN PATENT DOCUMENTS

JP          WO 99/41657          *    8/1999

\* cited by examiner

*Primary Examiner*—Emmanuel L. Moise
*Assistant Examiner*—Michael Pyzocha
(74) *Attorney, Agent, or Firm*—Drinker Biddle & Reath LLP (57) ABSTRACT

A navigation apparatus having a hard disk (called HD below) recording and reproduction unit and comprising: a password memory unit that stores a unique first password for each individual navigation apparatus, and that is used when recording data on or reproducing data from a first HD; the HD recording and reproduction unit that performs recording or reproduction by the first password; and a system control unit, which determines whether or not it is possible to use a second password for recording data on or reproducing data from a second HD that is used for updating the data on the first HD, and when it determines that it is possible to do, it updates the data on the first HD with one on the second HD, then it changes the second password to the first password.

22 Claims, 4 Drawing Sheets

DATA PROCESSING APPARATUS, A DATA PROCESSING METHOD, A DATA RECORDING MEDIUM ON WHICH DATA PROCESSING PROGRAM THAT IS READABLE BY A COMPUTER ARE RECORDED, AND A RECORDING MEDIUM

BACKGROUND OF THE INVENTION

1. Field of the Invention

This invention relates to a data processing apparatus, a data processing method, a data recording medium on which data processing program that is readable by a computer are recorded, and a recording medium, and more particularly to a data processing apparatus, a data processing method, a data recording medium on which data processing program that is readable by a computer are recorded, and a recording medium for preventing illegal distribution of data that are recorded on the recording medium that is installed in the data processing apparatus.

2. Description of the Related Art

In recent years, navigation equipment for automobiles has become widely used as a kind of data processing apparatus that uses a recording medium from which data can be read, and currently in a typical navigation apparatus, the use of an optical disk as the recording medium has become common.

In this case, it has been normal to use a read only optical disk as the optical disk used in the conventional navigation apparatus from which it was only possible to read the data that are recorded on the disk, however, in recent years as navigation equipment has become more functionable, it is desirable that it be possible for the user to write desired data on the optical disk.

Also, in the case of a conventional optical disk, a certain amount of time was required from the time that the detection pickup was moved to a position on the optical where the desired data are recorded, until detection began, so due to the need for quick data acquisition during high-speed movement, there arose a demand for a recording medium that was capable of detecting the desired data more quickly.

Therefore, recently there has been a lot of research into the possibility of using a hard disk, having a large storage capacity and to which data can be written and from which data can be searched at high speed, as the recording medium in a navigation apparatus.

However, currently hard disks are widely used for personal computers, so it is possible to use a personal computer to easily copy the contents of a hard disk, on which special data for a navigation apparatus have been recorded, to another hard disk, and as a result, there is a problem in that it is relatively easy to illegally distribute the hard disk, on which the contents have been copied, for use as the recording medium in another navigation apparatus.

SUMMARY OF THE INVENTION

Taking the above problem into consideration, it is the object of the present invention to provide, a data processing apparatus, a data processing method, a data recording medium on which data processing program readable by a computer is recorded, and a recording medium installed in the data processing apparatus, that are capable of effectively preventing illegal distribution of the recorded data, even in the case of using a re-writable recording medium, such as a hard disk, as the recording medium for a data processing apparatus such as a navigation apparatus.

The above object of the present invention can be achieved by a recording medium such as a hard disks etc., on which it is possible to record a password. The password is any one of a first password that cannot be updated and that is unique for each individual data processing apparatus, and a second password that is common for a plurality of data processing apparatuses including the data processing apparatus and that can be re-written to the first password; the data that are used in data processing by the data processing apparatus are recorded; and the second password is recorded on the recording medium before being installed in the data processing apparatus.

There is recorded a second password that can be rewritten as a unique first password for each individual data processing apparatus, so it is possible to protect the data from illegal distribution before mounting the data in the data processing apparatus, and with the first password it is possible to protect that data from illegal distribution after the data have been installed in the data processing apparatus.

It is also possible to effectively prevent illegal distribution of the data to be recorded even in the case of using a re-writable recording medium as the recording medium of the data processing apparatus.

The above object of the present invention can be achieved by a data processing apparatus that executes the data processing using the data that are recorded on the aforementioned recording medium. The data processing apparatus is provided with: a memory device such as a password memory unit etc., for storing the first password data together with the second password data; an extraction device such as a system control unit etc., for extracting the password data that are recorded on the recording medium; a judgment device such as a system control unit etc., for determining the contents of the extracted password data; and an update device such as a system control unit etc., for updating the password data that are recorded on the recording medium to the first password data when the judged contents are the same as the contents of the second password.

When the contents of the password data recorded on the recording medium is identical to the contents of the second password data, the password data are updated to the first password data, so it is possible to effectively protect the data recorded on the recording medium from illegal distribution after being installed in the data processing apparatus.

In one aspect of the data processing apparatus of the present invention, the data processing apparatus is further provided with: a recording and reproduction device such as a hard disk recording and reproduction unit etc., for performing at least recording data on or reproducing data from the recording medium; and a prohibiting device such as a system control unit etc., for prohibiting execution of the recording or the reproduction when the judged contents differ from both the contents of the first password and contents of the second password that are stored in the memory device.

When the contents of the password data recorded on the recording medium differ from both the contents of the first password data and the contents of the second password data, recording data on or reproducing data from the recording medium is prohibited, so it is possible to effectively protect the data recorded on the recording medium from illegal distribution after being installed in the data processing apparatus.

The above object of the present invention can be achieved by a data processing apparatus with pre-installed a re-writable recording medium such as a hard disks etc. The data processing apparatus is provided with: a password memory device such as a password memory unit etc., for storing a first password that is unique for each data processing apparatus, and which must be used in order to perform recording of data on or reproduction of data from the recording medium; a recording and reproduction device such as a hard disk recording and reproduction unit etc., for using the stored first password to perform recording or reproduction; a judgment device such as a system control unit etc., for determining whether or not it is possible to perform recording of data to or reproduction of data from an update recording medium by using a second password, which must be used in order to perform recording of data on or reproduction of data from the update recording medium, that is another medium, and that is used when updating the data on the recording medium; an update device such as a system control unit etc., for updating the data on the recording medium by using the data recorded on a proper update medium, which has been determined to be a proper update recording medium for which it is possible to perform either recording or reproduction by using the second password; and a change device such as a system control unit etc., for changing the second password to the first password after updating the data.

Since at least recording data on or reproducing data from an update recording medium are performed by using the second password data that can only be used for a proper update recording medium, it is possible to update the data on a previously installed recording medium after confirming that the update recording medium being used for the update is a proper recording medium, and it is also possible to prevent illegal copying and distribution of the data to be updated on the update recording medium before the data are used for the update.

Moreover, recording and reproducing the data before and after updating is restricted by using the unique first password data for each individual data processing apparatus, so it is possible to prevent illegal distribution of data on the recording medium to another data processing apparatus before and after updating.

It is also possible to effectively prevent illegal distribution of the data to be recorded even in the case of using a re-writable recording medium as the recording medium of the data processing apparatus.

In one aspect of the data processing apparatus of the present invention, the second password is common for a plurality of the proper update recording media.

The second password is common for a plurality of proper update media, so it is possible to eliminate the necessity of having to use the first password for each data processing apparatus in order to create an update recording medium to be used as the source for creating update media.

In another aspect of the data processing apparatus of the present invention, the second password is stored in the password memory device together with the first password.

The second password is stored in memory beforehand together with the first password, so it is not necessary to supply the second password again to update data.

In further aspect of the data processing apparatus of the present invention, the second password is supplied externally together with the update recording medium.

The second password is supplied from the outside. Since this second password is not stored in memory beforehand, it is possible to prevent this second password from being stolen and used.

The above object of the present invention can be achieved by a data processing apparatus with pre-installed a re-writable recording medium. The data processing apparatus and is provided with: a first password memory device such as a password memory unit etc., for storing a first password that is unique for each individual data processing apparatus and that must be used in order to perform either recording of data on or reproduction of data from the recording medium; a recording and reproduction device such as a hard disk recording and reproduction unit etc., for performing either recording or reproduction of data using the stored first password; and a second password memory device such as a password memory unit etc., for storing a second password that must be used in order to perform either recording of data on or reproduction of data from an update medium, which is another medium, and which is used when updating the data on the recording medium.

The first password for recording and reproducing data on the pre-installed recording medium, and the second password for recording data on or reproducing data from an update recording medium are stored in memory together, so when the second password is used to determine whether or not data can be recorded or reproduced and it is determined that recording or reproducing data is possible, the update recording medium is determined to be a proper update recording medium, and the data on the recording medium are updated using the data recorded on this proper update recording medium. Moreover, by changing the second password to the first password after updating the data, it is possible to update the data on the pre-installed recording medium, which has been confirmed in advance to be a proper update recording medium for update, by using the second password, which can only be used for a proper update recording medium, and at least recording data to or reproducing data from the update recording medium, as well as it is possible to prevent illegal copying and distribution before the update data on the update recording medium have been used for updating.

Also, since recording and reproducing the data before and after updating is restricted by using the unique first password data for each individual data processing apparatus, it is possible to prevent the data on the recording medium before and after update from being illegally distributed to another data processing apparatus.

It is also possible to effectively prevent illegal distribution of the data to be recorded even in the case of using a re-writable recording medium as the recording medium of the data processing apparatus.

The above object of the present invention can be achieved by a data processing method for a data processing apparatus with pre-installed a re-writable recording medium. The data processing method is provided with: a password memory process for storing a first password that is unique for each data processing apparatus, and which must be used in order to perform recording of data on or reproduction of data from the recording medium; a recording and reproduction process for using the stored first password to perform recording or reproduction; a judgment process for determining whether or not it is possible to perform recording of data on or reproduction of data from an update recording medium by using a second password, which must be used in order to perform recording of data on or reproduction of data from the update recording medium, that is another medium, and that is used when updating the data on the recording medium; an update process for updating the data on the recording medium by using the data recorded on a proper update medium, which has been determined to be a proper update recording medium for which it is possible to perform either recording or reproduction by using the second password; and a change process for changing the second password to the first password after updating the data.

At least recording data on or reproducing data from an update recording medium is performed by using the second password, which can only be used for a proper update recording medium, so it is possible to update data on the pre-installed recording medium after confirming that the update recording medium to be used in the update is a proper medium, and thus it is possible to prevent illegal copying and distribution of the update data on the update recording medium before using the data for updating.

Also, since recording and reproducing the data before and after updating is restricted by using the unique first password data for each individual data processing apparatus, it is possible to prevent the data on the recording medium before and after update from being illegally distributed to another data processing apparatus.

It is also possible to effectively prevent illegal distribution of the data to be recorded even in the case of using a re-writable recording medium as the recording medium of the data processing apparatus.

In one aspect of the data processing method of the present invention, the second password is common for a plurality of the proper update recording media.

The second password is common for a plurality of proper update media, so it is possible to eliminate the necessity of having to use the first password for each data processing apparatus in order to create an update recording medium to be used as the source for creating update media.

The above object of the present invention can be achieved by a data recording medium on which a data processing program is recorded so as to be readable through a computer which is contained in a data processing apparatus with a pre-installed re-writable recording medium. The data processing program causes the computer to function as: a password memory device for storing a first password that is unique for each data processing apparatus, and which must be used in order to perform recording of data on or reproduction of data from the recording medium; a recording and reproduction device for using the stored first password to perform recording or reproduction; a judgment device for determining whether or not it is possible to perform recording of data on or reproduction of data from an update recording medium by using a second password, which must be used in order to perform recording of data on or reproduction of data from the update recording medium, that is another medium, and that is used when updating the data on the recording medium; an update device for updating the data on the recording medium by using the data recorded on a proper update medium, which has been determined to be a proper update recording medium for which it is possible to perform either recording or reproduction by using the second password; and a change device for changing the second password to the first password after updating the data.

The computer functions such that at least recording data to or reproducing data from an update recording medium is performed by using the second password data, which can only be used for a proper update recording medium, so it is possible to update data on the pre-installed recording medium after confirming that the update recording medium to be used in the update is a proper medium, and thus it is possible to prevent illegal copying and distribution of the update data on the update recording medium before using the data for updating.

Also, since the computer functions such that recording and reproducing the data before and after updating is restricted by using the unique first password data for each individual data processing apparatus, it is possible to prevent the data on the recording medium before and after update from being illegally distributed to another data processing apparatus.

It is also possible to effectively prevent illegal distribution of the data to be recorded even in the case of using a re-writable recording medium as the recording medium of the data processing apparatus.

In one aspect of the data recording medium of the present invention, there is recorded a data processing program on the data recording medium so as to be readbale through a computer, wherein the second password is common for a plurality of the proper update recording media.

The second password is common for a plurality of proper update media, so it is possible to eliminate the necessity of having to use the first password for each data processing apparatus in order to create an update recording medium to be used as the source for creating update media.

The above object of the present invention can be achieved by a data processing apparatus provided with a re-writable recording medium and a controlling device. In the data processing apparatus, the re-writable recording medium is provided with first data; second data which is used for updating the first data; a first password which is used for access to the first data; and a second password which is used for access to the second data; and the controlling device clears restriction of access to the first data with the use of the first password; determines whether the second data is original with the use of the second password; and updates the first data with the second data when the second data is determined to be original.

A controlling device clears restriction of access to the first data with the use of the first password data, so it is possible effectively to protect the first data recorded on the pre-installed recording medium from illegal access. The controlling device determines in advance whether or not the second data is original with the use of the second password data, and updates the first data with the second data when the second data is determined to be original, so it is possible to prevent the first data from being updated by the data that is not original even in the case of using a re-writable recording medium as the recording medium of the data processing apparatus.

In one aspect of the data processing apparatus of the present invention, the controlling device changes the second password to the first password after the update of the first data; and the controlling device makes access to the first data and the second data with the use of the first password.

After updating the first data with the second data, the second password data is automatically changed. So it is possible to prevent the second data that was used for the update of the first data from being used for the further update of the first data. It is also possible to prevent illegal copying and distribution of the second data.

In another aspect of the data processing apparatus of the present invention, the first data is stored in the first recording medium; the second data is stored in the second recording medium; the first password is used for access to the first medium; and the second password is used for access to the second medium.

The first password data is required for access to the first recording medium. And the second password data is required for access to the second recording medium. It is possible effectively to restrict access to the recording media.

In further aspect of the data processing apparatus of the present invention, the first password is unique for each individual data processing apparatus; and the second password is common for a plurality of update recording media.

The access to the first data is restricted by the unique first password data for each individual data processing apparatus, so it is possible to prevent the first data recorded on the recording medium from illegal access. The second password is common for a plurality of proper update recording media, so it is possible to eliminate the necessity of having to use the first password which is unique for each individual data processing apparatus in order to create an update recording medium to be used as the source for creating update media, and thus it is also possible to improve the efficiency of its production.

In further aspect of the data processing apparatus of the present invention, a password memory device stores both the first password and the second password.

The second password is stored in memory beforehand together with the first password, so it is not necessary to supply the second password again to update data.

In further aspect of the data processing apparatus of the present invention, both first data and second data are map data; and the second data is newer than the first data.

The second map data is newer than the first map data, so it is possible to update the first map data with the map second data, which is newer.

The above object of the present invention can be achieved by a data processing method for a data processing apparatus. The data processing method is provided with: a clear process for clearing restriction of access to the first data with the use of the first password; a determination process for determining whether the second data is original with the use of the second password; and an update process for updating the first data with the second data when the second data is determined to be original.

A controlling device clears restriction of access to the first data with the use of the first password data, so it is possible effectively to protect the first data recorded on the pre-installed recording medium from illegal access. The controlling device determines in advance whether or not the second data is original with the use of the second password data, and updates the second data to the first data when the second data is original, so it is possible to prevent the first data from being updated by the data that is not original even in the case of the data processing apparatus with the re-writable recorded medium.

In one aspect of the data processing method of the present invention, the second password is changed to the first password after the update of the first data.

After updating the first data with the second data, the second password data is automatically changed. So it is possible to protect the further update of the first data with the second data that was used for the update of the first data. It is also possible to prevent illegal copying and distribution of the second data.

In another aspect of the data processing method of the present invention, the first data is stored in the first recording medium; the second data is stored in the second recording medium; the first password is used for access to the first medium; and the second password is used for access to the second medium.

The first password data is required for access to the first recording medium. And the second password data is required for access to the second recording medium. It is possible effectively to restrict access to the recording media.

In further aspect of the data processing method of the present invention, the first password is unique for each individual data processing apparatus; and the second password is common for a plurality of update recording media.

The access to the first data is restricted by the unique first password data for each individual data processing apparatus, so it is possible to prevent the first data recorded on the recording medium from illegal access. The second password is common for a plurality of proper update recording media, so it is possible to eliminate the necessity of having to use the first password which is unique for each individual data processing apparatus in order to create an update recording medium to be used as the source for creating update media, and thus it is also possible to improve the efficiency of its production.

In further aspect of the data processing method of the present invention, a password memory device stores both the first password and the second password.

The second password is stored in memory beforehand together with the first password, so it is not necessary to supply the second password again to update data.

In further aspect of the data processing method of the present invention, both first data and second data are map data; and the second data is newer than the first data.

The second map data is newer than the first map data, so it is possible to update the first map data with the map second data, which is newer.

DESCRIPTION OF THE PREFERRED EMBODIMENTS

The preferred embodiments of the invention will be explained based on the drawings.

The embodiments explained below are for the case when the present invention is applied to an automobile navigation apparatus (called simply navigation apparatus below) that is used to guide an automobile by displaying a map or outputting audio guidance.

(I) First Embodiment

Figure 1:
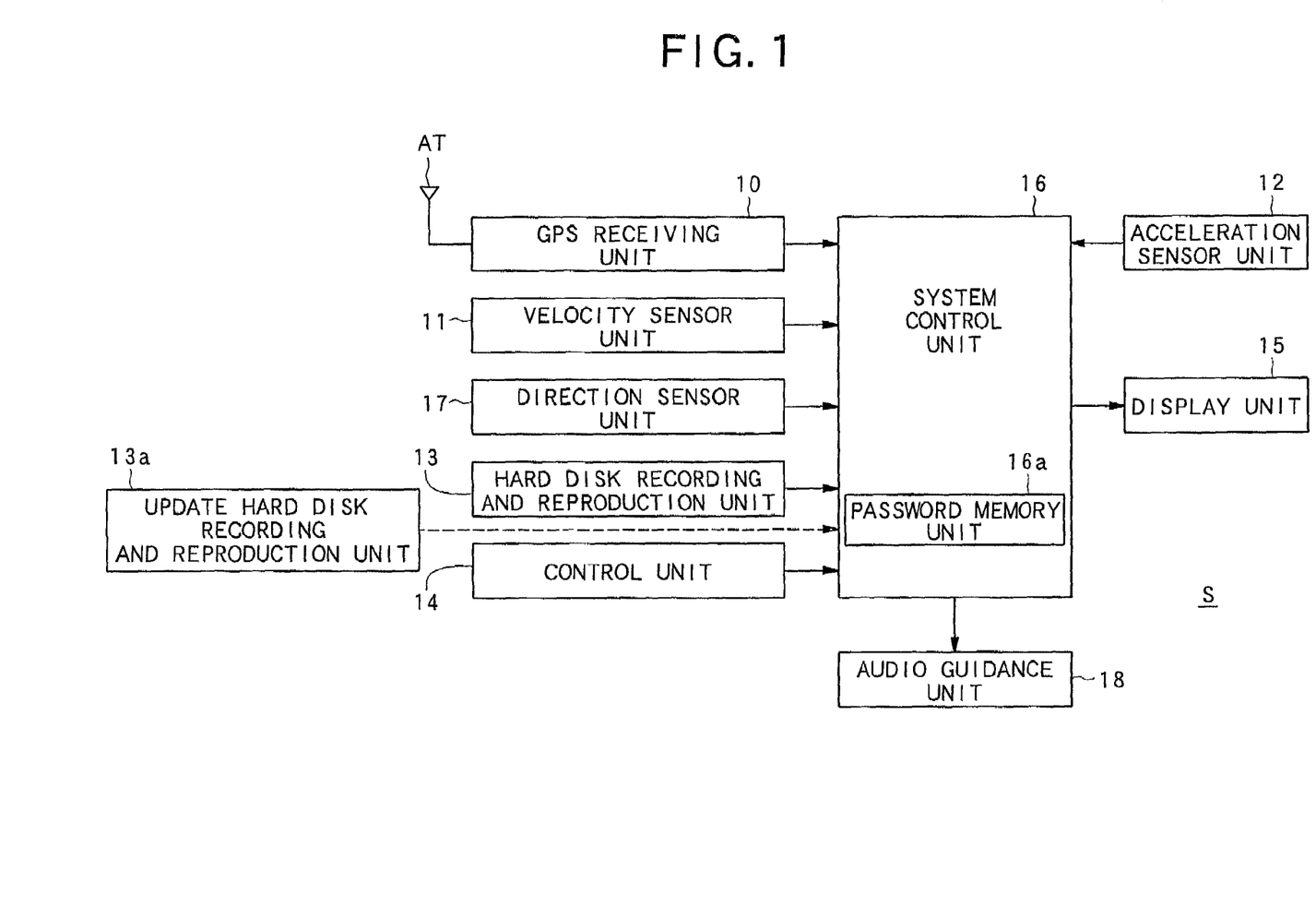
FIG. 1 is a block diagram showing the basic construction of the navigation apparatus of a first embodiment of the invention.
Figure 2:
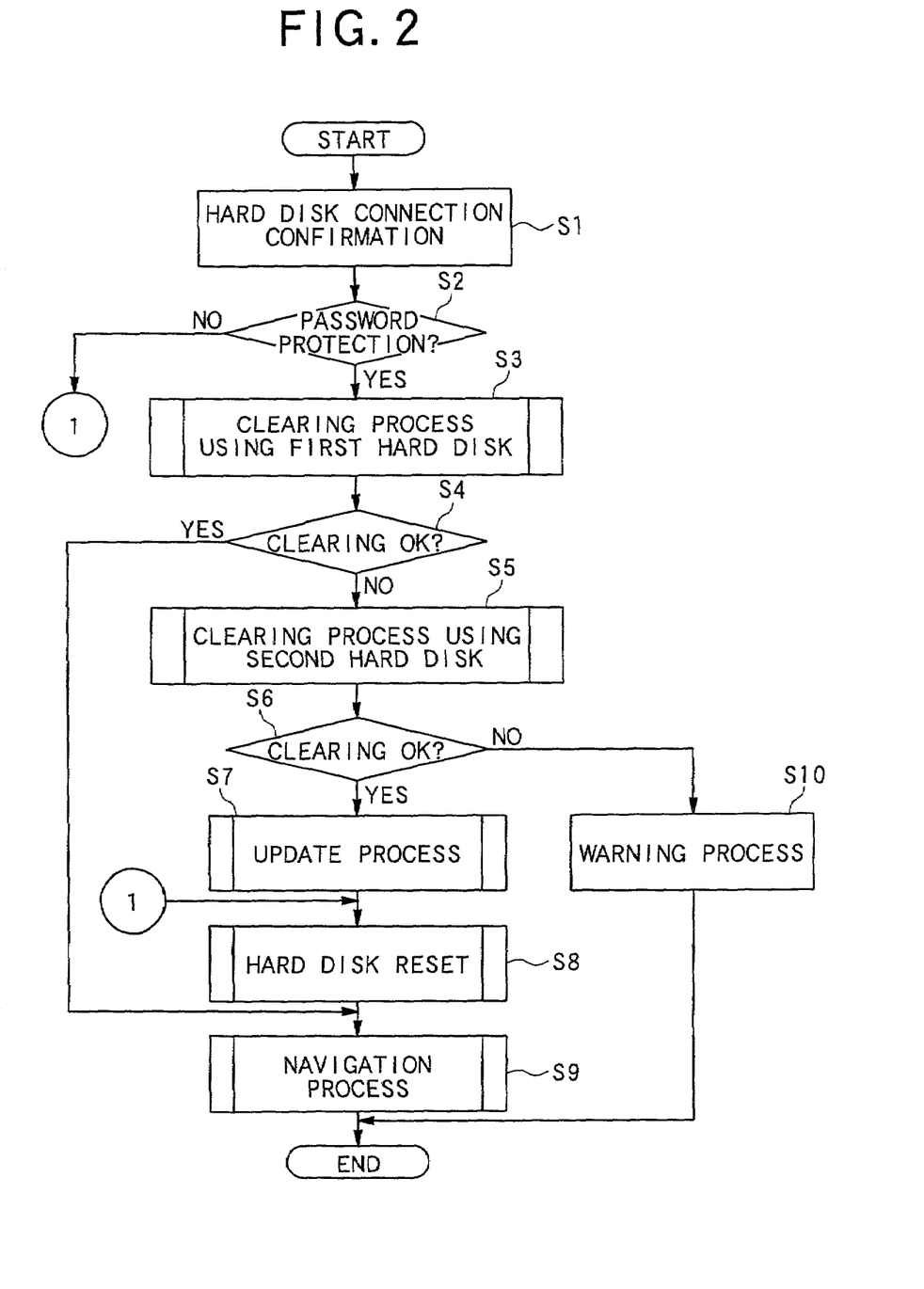
FIG. 2 is a flowchart showing the update process of the first embodiment of the invention.

FIG. 1 and FIG. 2 will be used to explain a first embodiment of the invention.

First, FIG. 1 is used to explain the overall construction and basic operation of the navigation apparatus of the first embodiment.

FIG. 1 is a block diagram showing the basic construction of the navigation apparatus of the first embodiment.

As shown in FIG. 1, the navigation apparatus S of the first embodiment comprises: a GPS (Global Positioning System) receiver unit 10, which is connected to an antenna AT; a velocity sensor unit 11; an acceleration sensor unit 12; a hard disk recording and reproduction unit 13, which contains a plurality of hard disks used as recording media and functions as a recording and reproduction method of reading data from or writing data to the hard disks; a control unit 14; a display unit 15; a system control device 16, which functions as an extraction device, an identification device, a prohibiting device, a judgment device, an update device and a change device, and contains a password memory unit 16A that functions as a first password memory device and a second password memory device for storing a first and a second password (described later); a direction sensor unit 17; and an audio guidance unit 18.

It is possible to connect an update hard disk recording and reproduction apparatus 13a to the system control unit 16. The update hard disk recording and reproduction apparatus 13a is included in the hard disk recording and reproduction unit 13. The update hard disk recording and reproduction apparatus 13a contains a plurality of hard disks that are used as the recording medium and the update recording medium for updating map data (described later) that is recorded on the hard disks.

Next, the basic operation will be explained.

First, by way of the antenna AT, the GPS receiver unit 10 receives a navigation signal from a plurality of satellites that belong to the GPS, and calculates pseudo coordinates for the current position, and outputs those coordinates to the system control unit 16 as GPS data.

On the other hand, the velocity sensor unit 11 detects the velocity of the automobile and converts the detected velocity into velocity data that is in the form of a pulse or voltage, and outputs that data to the system control unit 16.

Also, the direction sensor unit 17 comprises a so-called gyro sensor, and it detects the direction of the automobile, or in other words it detects the direction that the automobile is advancing in, then converts the detected direction into direction data that is in the form of a pulse or voltage, and outputs that data to the system control unit 16.

Furthermore, the acceleration sensor 12 compares gravitational acceleration with the acceleration generated by the movement of the automobile to detect the movement state of an upward or downward moving automobile, then it converts the detected movement state to acceleration data that is in the form of a pulse or voltage, and outputs that data to the system control unit 16.

Map data such as road maps, and additional data required for guidance are recorded on the hard disks in the hard disk recording and reproduction unit 13 so that they can be read.

Here reading map data or recording other additional data on the hard disks in the hard disk recording and reproduction unit 13 (the hard disks in the hard disk recording and reproduction unit 13 will collectively be referred to as the first hard disk) is not possible unless the first password, which is stored beforehand in the password memory 16a, is used.

The first password is a password that must be used when reading data from or writing data to the first hard disk, and is preset such that it is different for each navigation apparatus S and is stored in the password memory unit 16a. A 11 protection process is used for the first hard disk and hard disk recording and reproduction unit 13 such that it is not possible to read data from or write data to the first hard disk unless the first password is used. In this way, data that are recorded on the first hard disk can only be used for the navigation apparatus S in which the first password that enables reading and writing of data is stored. The first password can also be stored on the second hard disk that will be described later.

On the other hand, reading update map data from or recording additional data on the hard disks in the update hard disk recording and reproduction unit 13a (the hard disks in the update hard disk recording and reproduction unit 13a will collectively be referred to as the second hard disk) is not possible unless the second password, which is stored beforehand in the password memory 16a, is used.

Here, the second password is stored on the second hard disk before the update hard disk recording and reproduction unit 13a is installed in the navigation apparatus S, and it is preset beforehand as the password that must be used when reading data from or writing data to the second hard and it is set such that it is common for all proper update hard disk recording and reproduction units 13a and all proper navigation apparatuses S, and it is stored in the password memory unit 16a and the second hard disk. Also, a protection process is used for the second hard disk and update hard disk recording and reproduction unit 13a such that it is not possible to read data from or write data to the second hard disk unless the second password is used. In this way, data that are recorded on the second hard disk can only be used for the navigation apparatuses S in which the second password, which enables reading and writing of data, is stored.

The control unit 14 comprises a remote-control device that contains a plurality of keys such as various buttons and number keys, and it is used for entering instructions from the operator (for example automobile data display).

The display unit 15 displays map data, which are outputted from the hard disk recording and reproduction unit 13, and various status required for guidance by the navigation apparatus S.

The audio guidance unit 18 outputs audio driving guidance data, which includes the direction of the automobile at the next intersection and other data that must be relayed directly to the operator (traffic congestion information, blocked roads, etc.).

Together with these operations, the system control unit 16 performs overall control of the general functions of the navigation process, including all input and output ports (for example, GPS receiving port, key input port, display unit control port, etc.), and based on the driving data (position data and velocity data of the automobile) obtained from the position calculation unit (not shown in the figure), controls the display unit 15 such that it displays driving guidance data on the map showing the surrounding area and current position of the automobile, and controls the audio guidance unit 18 such that it outputs audio driving guidance.

Then, the position calculation unit calculates a plurality of current pseudo positions of the automobile based on velocity data and direction data that are outputted from the velocity sensor unit 11 and the direction sensor unit 17, and then compares the aforementioned pseudo coordinates that correspond with the current position that is outputted from the GPS receiving unit 10 with one of the calculated current pseudo positions, then it calculates the display position for the position mark (the position mark displays the current position of the automobile on the map), which is to be displayed by the display unit 15, and in addition to the current pseudo position, it also calculates driving information such as the velocity and direction of the automobile. The position calculation unit may be installed inside or outside of the system control unit 16.

Here, the navigation apparatus S of this embodiment contains the acceleration sensor 12 described above, so by using the acceleration data that were detected by the acceleration sensor 12, the position calculation unit calculates the current pseudo positions of the automobile while also determining the grade of the road and the difference of elevation.

In this way, it is possible to accurately calculate the current position of the automobile at positions that were difficult to calculate by simply using the data from the velocity sensor unit 11 and direction sensor unit 17, which only detect a two-dimensional position, for example, at three-dimensional intersections or at locations where the bridge of a freeway may overlap a normal road. Furthermore, when the automobile is going along a mountain road or on a hill, it is also possible to use the detected grade of the road to correct the error between the actual driving distance of the automobile and the distance moved on the map (in other words, error that occurs when the driving distance is longer than the distance moved on a flat map as the result of going up or down a grade) that occurs when calculating the current position based on data from the velocity sensor unit 11 and the direction sensor unit 17.

Next, FIG. 2 will be used to explain the update process of the first embodiment used for updating map data.

FIG. 2 is a flowchart showing the update process that is repeatedly executed by the system control unit 16 at set time intervals.

Here, the process shown in the flowchart is executed simultaneously for all of the hard disk recording and reproduction units that are connected to the system control unit 16 (in the case of the first embodiment, these are the hard disk recording and reproduction unit 13 and the update hard disk recording and reproduction unit 13a), so in the following explanation, these will all be explained collectively as one.

In the case of updating map data that are recorded on the first hard disk by using the update map data that are recorded on the second hard disk, first, the hard disk recording and reproduction units 13 and 13a are checked as to whether or not they are properly connected to the system control unit 16 (step S1), then the first hard disk and second hard disk are checked as to whether or not they are protected by the first password (step S2).

When the hard disks are not protected by the first password (step S2: No), the process advances to step S8 (described later) and the protection process that uses the first password is performed for the hard disks, however, when the hard disks are protected by the first password (step S2: Yes), the first password is used to see if the protection process that has been performed for the hard disks can be cleared (step S3).

When the hard disks have not been protected by the first password in step S2 (step S2: No), there is something abnormal about the navigation apparatus S and that error is displayed, and it is possible to end processing as is.

The protection process is then checked as to whether or not it was cleared with the clearing process in step S3 (step S4), and when it was possible to clear the process (step S4: Yes), the hard disk, which is the object of the clearing process, ought to be the first hard disk, and in this case, the process moves to the normal navigation process of reading map data from the first hard disk and displaying the corresponding map (step S9) and processing ends.

On the other hand, when it is determined in step S4 that the protection process could not be cleared (step S4: No), the hard disk, which is the object of the clearing process, ought to be the second hard disk, and in this case, the second password is used in an attempt to clear the protection process that has been executed for the second hard disk (step S5).

The protection process is then checked as to whether or not it was cleared by the clearing process in step S5 (step S6), and when it was cleared (step S6: Yes), the update process for updating the map data on the first hard disk is performed by using the second hard disk, which was the object of the clearing process (step S7).

Next, when the update process has finished, the first password is used to perform the protection process for the second hard disk (in other words, the second password that was set for the protection process of the second hard disk is changed to the first password) (step S8), then the process moves to the normal navigation process that uses both the first and the second hard disks (step S9) and processing ends.

On the other hand, when it is determined in step S6 that the protection process cannot be cleared even by using the second password (step S6: No), the hard disk recording and reproduction unit, which includes the hard disk that could not be cleared, is neither the original hard disk recording and reproduction unit 13 that was installed in the navigation apparatus S nor a proper update hard disk recording and reproduction unit 13a, so it is determined that the hard disk recording and reproduction unit, which includes the hard disk that could not be cleared, is an unknown and improper hard disk recording and reproduction unit and a warning is displayed on the display unit 15 (step S10), and processing ends as is without moving to the navigation process.

As explained above, with the update process for updating map data of this first embodiment of the invention, map data can be recorded on or reproduced from the second hard disk by using the second password, which can only be used for the proper update hard disk recording and reproduction unit 13a, so after confirming in advance that the second hard disk to be used in updating is a proper hard disk, it is possible to update the data on the first hard disk, and thus it is possible to prevent the update map data on the second hard disk from being illegally copied and distributed before using it for the update.

Moreover, recording or reproducing the map data before or after updating is restricted by using the first password, which is unique for each individual navigation apparatus S, so it is possible to prevent illegal distribution of the map data on the first and the second hard disks to other navigation apparatuses before and after updating.

Furthermore, the second password is common for a plurality of proper update hard disk recording and reproduction units 13a, so it is possible to eliminate the need for using the first password of each navigation apparatus as the source when creating an update hard disk recording and reproduction unit 13a.

Also, since the second password is stored in the password memory unit 16a together with the first password, it is not necessary to supply the second password each time the data are to be updated.

(II) Second Embodiment

Figure 3:
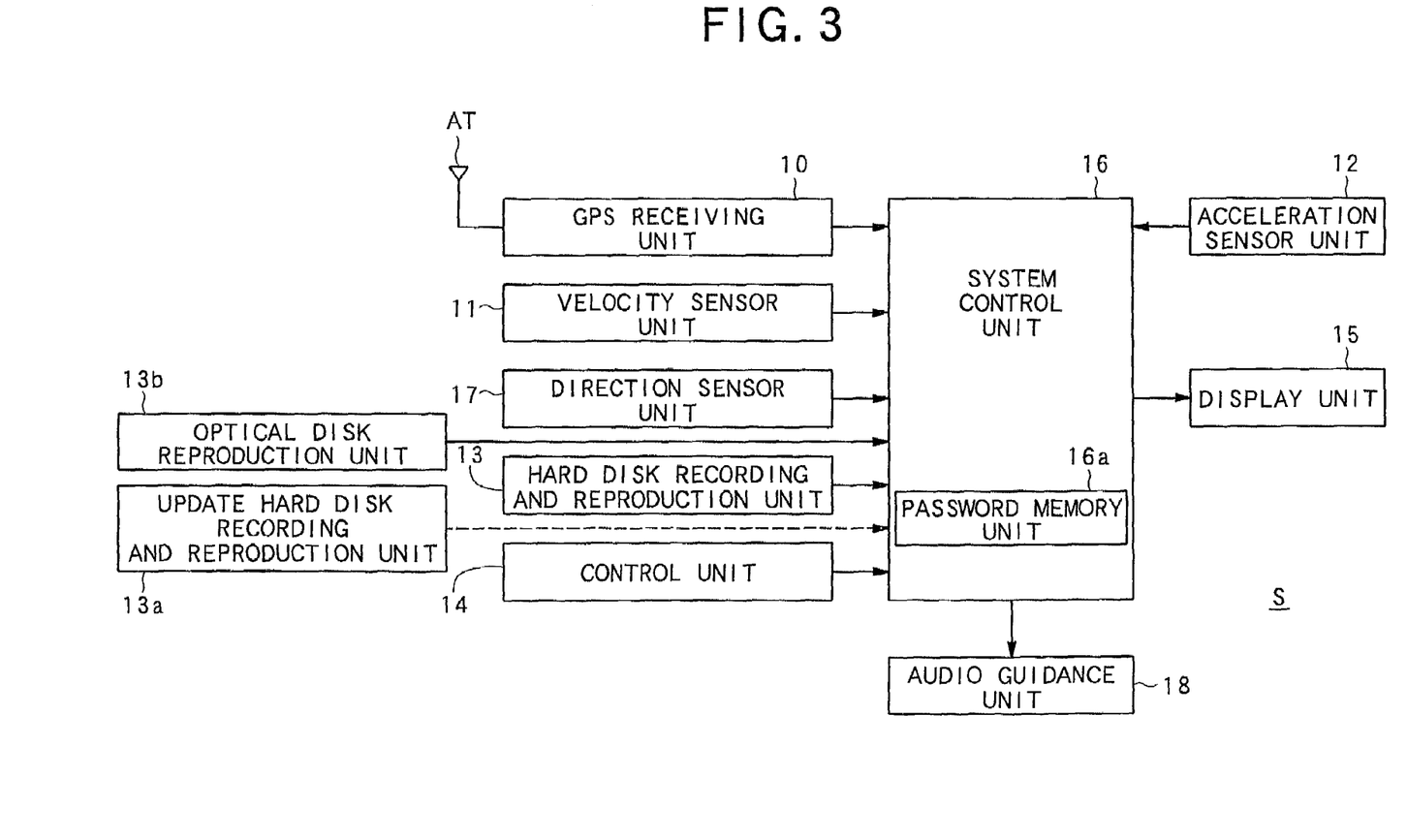
FIG. 3 is a block diagram showing the basic construction of the navigation apparatus of a second embodiment of the invention.
Figure 4:
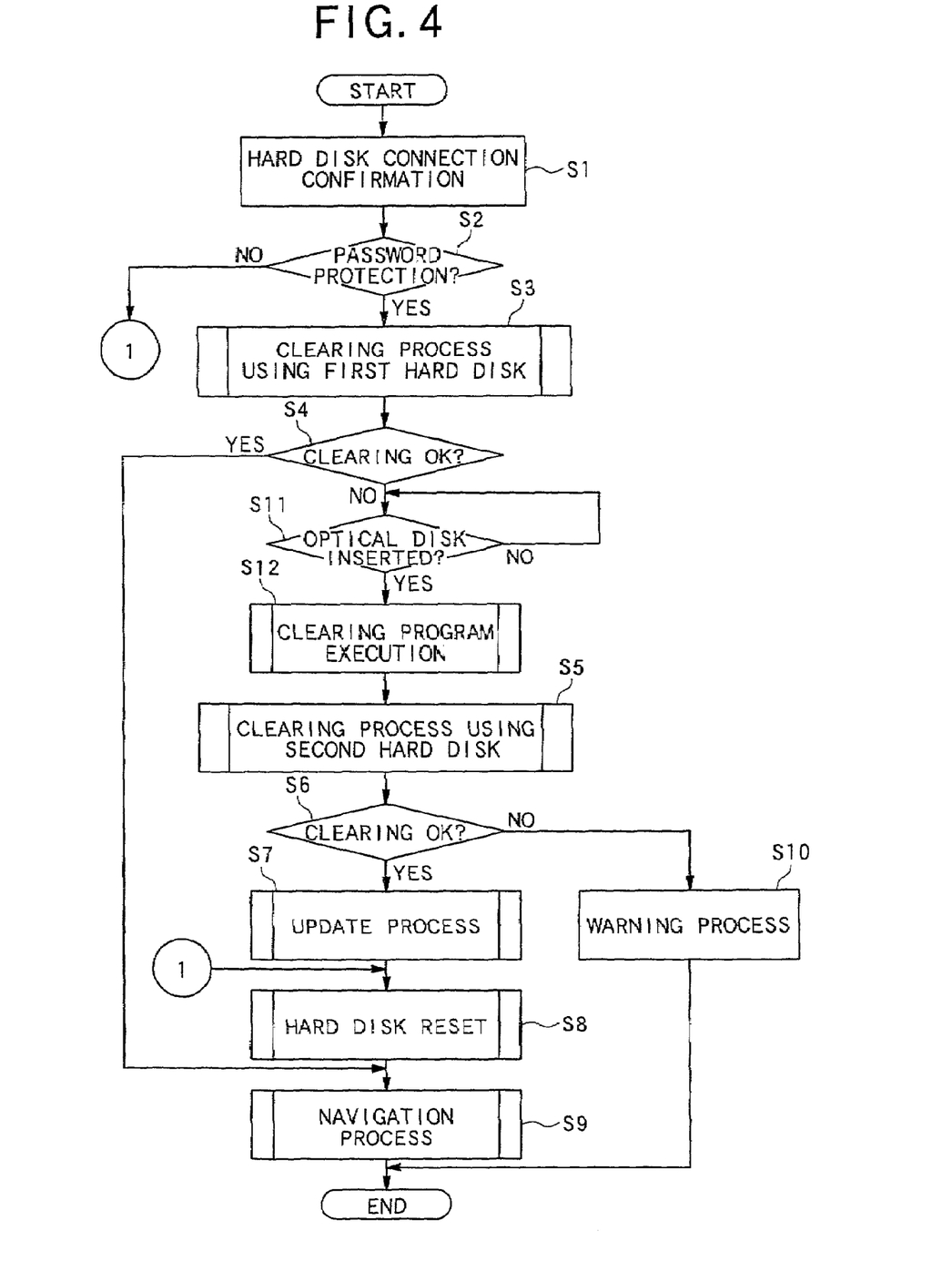
FIG. 4 is a flowchart showing the update process of the second embodiment of the invention.

Next, FIG. 3 and FIG. 4 will be used to explain a second embodiment of the invention.

In the first embodiment described above, the case of storing the second password, which is used for clearing the protection process for the second hard disk used for updating, in advance in the password memory unit 16a together with the first password was explained, however in the second embodiment, the second password is supplied from the outside together with the update hard disk recording and reproduction unit 13a.

First, FIG. 3 will be used to explain the overall construction and basic operation of the navigation apparatus of this second embodiment.

FIG. 3 is a block diagram showing the basic construction of the navigation apparatus of this second embodiment.

In the following explanation, the same code numbers will be used for components that are the same as those of the navigation apparatus S of the first embodiment shown in FIG. 1, and any detailed explanation will be omitted.

As shown in FIG. 3, the navigation apparatus S' of this second embodiment comprises the same GPS receiving unit 10 with an antenna AT; a velocity sensor unit 11; an acceleration sensor unit 12; a hard disk recording and reproduction unit 13; a connectable update hard disk recording and reproduction unit 13a; a control unit 14; a display unit 15; a system control unit 16 with a password memory unit 16A; a direction sensor unit 17 and an audio guidance unit 18 as in the navigation apparatus S of the first embodiment; as well as, an optical disk reproduction unit 13b, which reproduces data from an optical disk that is the same as the optical disk used in a conventional navigation apparatus, and outputs that data to the system control unit 16.

Next, the basic operation will be explained.

The GPS receiving unit 10, the velocity sensor unit 11, the direction sensor unit 17, the acceleration sensor unit 12, the first hard disk, the second hard disk, the control unit 14, the display unit 15, the audio guidance unit 18 and the system control unit 16 perform the same operations as those of the navigation apparatus S of the first embodiment.

Here, the feature of using the first password to perform protection processing for the first hard disk, the feature of using the second password to perform protection processing for the second hard disk, and the contents of the first password and second password, in other words, the feature that a different first password is set in advance for each navigation apparatus S as the password to be used when reading data from or writing data to the first hard disk, and stored in the password memory unit 16a, and that a common second password is set in advance for all proper update hard disk recording and reproduction units 13a and all proper navigation apparatuses S as the password to be used when reading data from and writing data to the second hard disk, are the same as those of the first embodiment.

In this second embodiment, the second password is not preset in the password memory unit 16a, but is input by way of an optical disk reproduction unit 13b to be described later.

In addition, as will be described later, the system control unit 16 reads the second password and a program for performing the clearing process using that password from the optical disk that is installed in the optical disk reproduction unit 13b, then by using the second password to execute this process, clears the protection process that has been performed for the second hard disk.

Next, FIG. 4 will be used to explain the update process for updating map data of this second embodiment.

FIG. 4 is a flowchart showing the update process that is repeatedly executed by the system control unit 16 at set time intervals.

In the explanation below, the same step numbers will be given to steps that are identical to those in the update process of the first embodiment shown in FIG. 2, and a detailed explanation of them will be omitted.

Here, the process shown in the flowchart of FIG. 4 is executed simultaneously for all of the hard disk recording and reproduction units that are connected to the system control unit 16 (in the case of the second embodiment, these are the hard disk recording and reproduction unit 13 and the update hard disk recording and reproduction unit 13a), so in the following explanation, these will all be explained collectively as one.

In the case of updating map data that are recorded on the first hard disk by using the update map data that are recorded on the second hard disk, at first, the same steps S1 to S4 that were executed in the first embodiment are executed.

In the judgment of step S4, when it is determined that the protection process that has been performed for the hard disks cannot be cleared using the first password (step S4: No), the hard disk that is the object of the clearing process is to be the second hard disk, and in that case, next, whether or not the optical disk, on which the second password itself and the program for clearing the protection process that has been performed for the second hard disk using the second password, has been inserted and installed in the optical disk reproduction unit 13b is checked (step S11).

When the optical disk has not been inserted nor installed in the optical disk reproduction unit 13b (step S11: No), that is displayed by the display unit 15, and the process waits until the optical disk is inserted and installed, however, when the optical disk has been inserted and installed in the optical disk reproduction unit 13b (step S11: Yes), the aforementioned program for clearing and second password are read from the inserted and installed optical disk, and the program is executed (step S12), an attempt is made to clear the protection process that has been performed for the second hard disk (step S5).

After this, the same steps S6 to S10 that were executed in the first embodiment are executed and all processing ends.

As explained above, with the update process for updating map data of this second embodiment of the invention, map data can be recorded on or reproduced from the second hard disk by using the second password, which can only be used for the proper update hard disk recording and reproduction unit 13a, so after confirming in advance that the second hard disk to be used in updating is a proper hard disk, it is possible to update the data on the first hard disk, and thus it is possible to prevent the update map data on the second hard disk from being illegally copied and distributed before using it for the update.

Moreover, recording or reproducing the map data before or after updating is restricted by using the first password, which is unique for each individual navigation apparatus S, so it is possible to prevent illegal distribution of the map data on the first and the second hard disks to other navigation apparatuses before and after updating.

Furthermore, the second password is common for a plurality of proper update hard disk recording and reproduction units 13a, so it is possible to eliminate the need for using the first password of each navigation apparatus as the source when creating an update hard disk recording and reproduction unit 13a.

Also, since the second password is supplied externally, it is possible to prevent the second password from being stolen after being stored in memory beforehand.

In each of the embodiments described above, the case of connecting an update hard disk recording and reproduction unit 13a to the originally installed hard disk recording and reproduction unit 13 was explained, however, it is also possible to apply the invention to clearing the protection process when replacing the hard disk recording and reproduction unit 13 with an update hard disk recording and reproduction unit 13a.

In each of the embodiments described above, the password is used for access to the recording medium. However, when the password is used for access a specific data of a plurality of data recorded on the recording medium, it is possible to protect the specific data recorded on the recording medium.

Also, for the embodiments described above, the case of using a hard disk as the recording medium was explained, however, the invention can be applied to other recording media as long as the medium is re-writable, such as in the case of updating the contents of a semiconductor memory.

Moreover, for the embodiments described above, the case of applying the invention to a navigation apparatus that uses map data was explained, however, it is also possible to apply the invention to the case that a music reproduction apparatus that is equipped with a re-writable recording medium, on which a plurality of songs are stored, is added and connected to another recording medium, on which a plurality of other songs are stored.

Furthermore, it is also possible to store the program that corresponds to the flowchart shown in FIG. 2 or FIG. 4 on a recording medium such as a flexible disk or a hard disk, then by reading and executing that program by a general-purpose computer such as a microcomputer, it is possible for the general-purpose computer to function as the system control unit 16.

In the aforementioned embodiment, the present invention is described in the case of applying to a navigation apparatus for vehicles. But the present invention can be applied not only to a navigation apparatus for vehicles but also a cellular phone or a cellular terminal which can work as a navigation apparatus. That is to say, the present invention can be applied to a vehicle navigation system which has a present position detecting device for detecting its position, and to a navigation system for the aforementioned cellular phone or the aforementioned cellular terminal. In addition, the present invention can be applied to a navigation system that the base station detects the present position of the navigation apparatus, and that the aforementioned navigation apparatus receives the results from the base station.

The entire disclosure of Japanese Patent Application No. 2000-398918 filed on Dec. 27, 2000 including the specification, claims, drawings and summary is incorporated herein by reference in its entirety.

What is claimed is:

1. A recording medium which is provided for recording data and a first password and a second password into it, wherein
   the first password cannot be updated and is unique for each individual data processing apparatus, and the second password is common for a plurality of data processing apparatuses including said data processing;
   the data to be processed in said data processing apparatus are previously recorded onto the recording medium;
   said second password is recorded on said recording medium to prevent the data thereon from being illegally copied and distributed from the recording medium before installation of the data into the data processing apparatus, and changed to the first password after the installation; and
   said first password prevents the data from being illegally copied and distributed from the recording medium and the data processing apparatus on or after installing the data on the data processing apparatus.

2. A data processing apparatus that executes said data processing by using said data that are recorded on said recording medium of claim 1, said data processing apparatus comprising:
   a memory device which stores said first password together with said second password;
   an extraction device which extracts the password data that are recorded on said recording medium;
   a judgment device which determines the contents of said extracted password data; and
   an update device which updates said password that are recorded on said recording medium to said first password data when said judged contents are the same as the contents of said second password.

3. The data processing apparatus of claim 2, further comprising:
   a recording and reproduction device which performs at least recording data on or reproducing data from said recording medium; and
   a prohibiting device which prohibits execution of said recording or said reproduction when said judged contents differ from both the contents of said first password and contents of said second password that are stored in said memory device.

4. A data processing apparatus with a re-writable recording medium pre-installed into it, said data processing apparatus comprising:
   a password memory device which stores a first password and a second password, the first password being unique for each data processing apparatus, and must be used in order to perform recording of data on or reproduction of data from said recording medium, and said first password preventing the data from being illegally copied and distributed from the recording medium and the data processing apparatus on or after installing the data on the data processing apparatus;
   a recording and reproduction device which uses said stored first password to perform recording or reproduction;
   a judgment device which determines whether or not it is possible to perform recording of data to or reproduction of data from an update recording medium by using said second password to prevent the data from being illegally copied and distributed from the recording medium and that must be used in order to perform recording of data on or reproduction of data from said update recording medium, said update recording medium other than said recording medium and used when updating the data on said recording medium;
   an update device which updates said data on said recording medium by using the data recorded on said update recording medium that is determined to be proper as enabling either recording or reproduction when said second password is used; and
   a change device which changes said second password to said first password after updating said data.

5. The data processing apparatus of claim 4, wherein said second password is common for a plurality of said update recording media _determined to be proper.

6. The data processing apparatus of claim 4, wherein said second password is stored in said password memory device together with said first password.

7. The data processing apparatus of claim 4, wherein said second password is supplied externally together with said update recording medium.

8. A data processing method for a data processing apparatus with a re-writable recording medium pre-installed into it, said data processing method comprising:
   a password memory process which stores a first password and a second password, said first password being unique for each data processing apparatus, and must be used in order to perform recording of data on or reproduction of data from said recording medium, and said first password preventing the data from being illegally copied and distributed from the recording medium and the data processing apparatus on or after installing the data on the data processing apparatus;
   a recording and reproduction process which uses said first password thus stored to perform recording or reproduction;

a judgment process which determines whether or not it is possible to perform recording of data on or reproduction of data from an update recording medium by using said second password to prevent the data from being illegally copied and distributed from the recording medium and that must be used in order to perform recording of data on or reproduction of data from said update recording medium, said update recording medium being other than the recording medium and used when updating the data on said recording medium;

an update process which updates said data on said recording medium by using the data recorded on said update recording medium that is determined to proper as enabling either recording or reproduction when said second password is used; and a change process which changes said second password to said first password after updating said data.

9. The data processing method of claim 8, wherein said second password is common for a plurality of said update recording media determined to be proper.

10. A data recording medium on which a data processing program is recorded so as to be readable through a computer which is contained in a data processing apparatus with a re-writable recording medium pre-installed into it, said data processing program causing said computer to function as:

a password memory device which stores a first password and a second password, said first password being unique for each data processing apparatus and must be used in order to perform recording of data on or reproduction of data from said recording medium, and said first password preventing the data from being illegally copied and distributed from the recording medium and the data processing apparatus on or after installing the data on the data processing apparatus;

a recording and reproduction device which uses said stored first password to perform recording or reproduction;

a judgment device which determines whether or not it is possible to perform recording of data on or reproduction of data from an update recording medium by using said second password to prevent the data from being illegally copied and distributed from the recording medium and that must be used in order to perform recording of data on or reproduction of data from said update recording medium, said update recording medium being other than the recording medium and used when updating the data on said recording medium;

an update device which updates said data on said recording medium by using the data recorded on said update recording medium that is determined to be proper as enabling either recording or reproduction when said second password is used; and a change device which changes said second password to said first password after updating said data.

11. The data recording medium of claim 10 on which a data processing program is recorded so as to be readable through a computer, wherein said second password is common for a plurality of said update recording media_determined to be proper.

12. A data processing apparatus having a re-writable recording medium and a controlling device, wherein the rewritable recording medium comprises first data; second data which is used for updating the first data; a first password which is used for access to the first data and prevents the first data from being illegally copied and distributed from the recording medium and the data processing apparatus on or after installing the first data on the data processing apparatus; and a second password which is to prevent the first data from being illegally copied and distributed from the recording medium and is used for access to the second data; and the controlling device clears restriction of access to the first data with use of the first password;

the controlling device determines whether or not the second data is original with use of the second password;

the controlling device changes the first data to the second data when the second data is determined to be original;

the controlling device changes the second password to the first password after the update of the first data; and the controlling device makes access to the first data and the second data with the use of the first password.

13. The data processing apparatus of claim 12, wherein the first data is stored in a first recording medium;

the second data is stored in a second recording medium; the first password is used for access to the first recording medium; and the second password is used for access to the second recording medium.

14. The data processing apparatus of claim 12, wherein the first password is unique for each individual data processing apparatus; and the second password is common for a plurality of update recording media.

15. The data processing apparatus of claim 14, further comprising:

a password memory device which stores both the first password and the second password.

16. The data processing apparatus of claim 12, wherein both the first data and the second data are map data; and the second data is newer than the first data.

17. A data processing method for a data processing apparatus having a re-writable recording medium and a controlling device, said data processing method comprising:

a clear process which clears restriction of access to first data with use of a first password that prevents the first data from being illegally copied and distributed from the recording medium and the data processing apparatus on or after installing the first data on the data processing apparatus;

a determination process which determines whether second data is original with use of a second password that is used to prevent the first data from being illegally copied and distributed from the recording medium;

an update process which changes the first data to the second data when the second data is determined to be original; and a password memory process which stores both the first password and the second password.

18. The data processing method of claim 17, wherein the second password is changed to the first password after the update of the first data.

19. The data processing method of claim 17, wherein the first data is stored in a first recording medium;

the second data is stored in a second recording medium; the first password is used for access to the first recording medium; and the second password is used for access to the second recording medium.

20. The data processing method of claim 17, wherein the first password is unique for each individual data processing apparatus; and the second password is common for a plurality of update recording media.

21. The data processing method of claim 17, wherein both the first data and the second data are map data; and the second data is newer than the first data.

22. A recording medium having information, to be processed with an information processing apparatus, recorded onto it, the recording medium being separate from the information processing apparatus, including:

a first password and a second password stored thereon;
the second password being used in common with a plurality of information processing apparatuses, the second password being previously recorded onto the recording medium and preventing data from being illegally copied and distributed from the recording medium and the data processing apparatus on or after installing the data on the data processing apparatus, wherein the second password can be changed to the first password inherent in one of the information processing apparatuses on or after a contents of the recording medium is processed with one of the information processing apparatuses, said first password being used to prevent the data thereon from being illegally copied and distributed from the recording medium.

* * * * *